United States Patent [19]

Ling

[11] Patent Number: 5,412,686
[45] Date of Patent: May 2, 1995

[54] METHOD AND APPARATUS FOR POWER ESTIMATION IN A COMMUNICATION SYSTEM

[75] Inventor: Fuyun Ling, Hoffman Estates, Ill.

[73] Assignee: Motorola Inc., Schaumburg, Ill.

[21] Appl. No.: 123,452

[22] Filed: Sep. 17, 1993

[51] Int. Cl.[6] .................... H04L 27/30; H04B 17/00
[52] U.S. Cl. .................................. 375/200; 455/67.1
[58] Field of Search ......................... 370/32.1; 375/1; 342/463; 455/67.1

[56] References Cited

U.S. PATENT DOCUMENTS

| | | | |
|---|---|---|---|
| 4,591,669 | 5/1986 | Duttweiler et al. | 370/32.1 |
| 4,811,357 | 3/1989 | Betts et al. | 375/1 |
| 4,901,307 | 2/1990 | Gilhousen et al. | 375/1 |
| 4,942,589 | 7/1990 | Smith et al. | 375/1 |
| 5,056,105 | 10/1991 | Darmon et al. | 375/1 |
| 5,056,109 | 10/1991 | Gilhousen et al. | 375/1 |
| 5,099,204 | 3/1992 | Wheatley, III . | |
| 5,101,501 | 3/1992 | Gilhousen et al. | 375/1 |
| 5,103,459 | 4/1992 | Gilhousen et al. | 375/1 |
| 5,107,225 | 4/1992 | Wheatley, III . | |

(List continued on next page.)

OTHER PUBLICATIONS

Sklar, Bernard, *Digital Communications: Fundamentals and Applications*, Prentice Hall, Englewood Cliffs, N.J., 1988, Chapters 5 & 6 pp. 245–380.

Dixon, Robert C., *Spread Spectrum Systems 2nd Ed.*, John Wiley & Sons, New York, N.Y., 1984 Chapters 1 & 2, pp. 1–55.

"On the System Design Aspects of Code Division Multiple Access (CDMA) Applied to Digital Cellular and Personal Communications Networks", A. Salmasi and K. S. Gilhouse, *Proc. of 41st Vehicular Technology Conference* in St. Louis, Mo., May 19–22, 1991, pp. 57–62.

"The Weight Spectra of Some Short Low–Rate Convolutional Codes", Jean Conan, *IEEE Transactions on Commnications*, vol. COM–32, No. 9 (Sep. 1984) pp. 1050–1053.

"Performance of Convolutional Codes with Interleaving in the Interference Limited Rayleigh Fading Channel", Li Fung Chang and Sirkiat Ariyavisitakul, *Proceedings of 41st Vehicular Technology Conference* in St. Louis, Mo., May 19–22, 1991, pp. 812–816.

K. S. Gilhousen, et al., "On the Capacity of a Cellular CDMA System," IEEE Trans. on VT, vol. 40, No. 2, pp. 303–311, May 1991.

F. Ling and D. Falconer, "Orthogonal/Convolutional Coding for Reverse Channel CDMA Communication," *Proc. of VTC '92*, pp. 63–66, May, 1992, Denver, Colo.

L. F. Chang and N. R. Sollenberger, "Comparison of (List continued on next page.)

*Primary Examiner*—Salvatore Cangialosi
*Attorney, Agent, or Firm*—Daniel C. Crilly; Richard A. Sonnentag; Raymond J. Warren

[57] ABSTRACT

A method and apparatus is provided for estimating signal power. This is accomplished by demodulating a received communication signal to derive a stream of samples. These samples may consist of either reference samples, data samples, or a combination thereof. An estimate of the power of the received communication signal is then generated as a function of the stream of samples. The signal power estimate may, for example, be used in a power control algorithm by setting a power control indicator in response to a comparison between the signal power estimate and a predetermined threshold. Subsequently, the power control indicator is transmitted over a communication channel to another communication unit. The communication unit detects a power control indicator within a signal received from over the communication channel and adjusts a particular signal transmission power of a signal transmitter in response to the detected power control indicator.

34 Claims, 3 Drawing Sheets

U.S. PATENT DOCUMENTS

| | | | |
|---|---|---|---|
| 5,109,390 | 4/1992 | Gilhousen et al. | 375/1 |
| 5,216,692 | 6/1993 | Ling | 375/1 |
| 5,280,295 | 1/1994 | Kelley et al. | 342/463 |
| 5,295,136 | 3/1994 | Ashley et al. | 370/32.1 |
| 5,297,161 | 3/1994 | Ling | 375/1 |
| 5,305,468 | 4/1994 | Bruckert et al. | 455/67.1 |
| 5,329,547 | 7/1994 | Ling | 375/1 |

OTHER PUBLICATIONS

Two Interleaving Techniques for CDMA Radio Communication Systems," *Proc. of VTC '92*, pp. 275–278, May, 1992, Denver, Colo.

Y. J. Liu, "Soft Decision Decoding for a Bit–Interleaved Convolutionally Encoded Code Division Multiple Access System over Rayleigh Fading Channel," *Proc. of PIMRC '92*, pp. 128–132, Oct. 1992.

M. L. Moher and J. H. Lodge, "TCMP—A Modulation and Coding Stategy for Fading Channels," *IEEE JSAC*, vol. SAC–7, pp. 1347–1355, Dec. 1985.

G. T. Irvine and P. J. McLane, "Symbol–Aided Plus Decision–Directed Reception for PSK/TCM Modulation on Shadowed Mobile Satellite Fading Channels," *IEEE JSAC*, vol. SAC–10, pp. 1289–1299, Dec. 1992.

A. J. Viterbi, "Spread Spectrum Communications—Myths and Realities," *IEEE Comm. Magazine*, vol. 17, No. 3, pp. 11–18, May 1979.

A. J. Viterbi and A. M. Viterbi, "Nonlinear Estimation of PSK–Modulated Carrier Phase with Application to Burst Digital Transmition," *IEEE Trans. on Info. Theory*, vol. IT–29, No. 4, pp. 543–551, Jul. 1983.

"Two Classes of Convolutional Codes Over GF(q) for q–ary Orthogonal Signaling", William E. Ryan and Stephen G. Wilson, *IEEE Transactions on Communications*, vol. 39, No. 1 (Jan. 1988), pp. 30–40.

"CDMA Power Control for Wireless Networks", Jack M. Holtzman, *Proceedings of 2nd WINLAB Workshop on 3rd Generation Wireless Interface Networks* in East Brunswick, N.J., Oct. 1990, pp. 264–273.

"CDMA Power Control, Interleaving, and Coding", Floyd Simpson and Jack Holtzman, *Proceedings of ICC '91*, pp. 362–367.

METHOD AND APPARATUS FOR POWER ESTIMATION IN A COMMUNICATION SYSTEM

RELATED INVENTIONS

The present invention is related to the following invention which is assigned to the assignee of the present invention. Method and Apparatus for Coherent Communication in a Spread-Spectrum Communication System by Fuyun Ling having U.S. Ser. No. 08/031,258, and filed on Mar. 11, 1993, now U.S. Pat. No. 5,329,547.

FIELD OF THE INVENTION

The present invention relates to communication systems and, more particularly, to a method and apparatus for signal power estimation in a communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

One type of communication system is a spread-spectrum system. In a spread-spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread-spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread-spectrum communication techniques exist, including direct sequence modulation, frequency and/or time hopping modulation, and chirp modulation. In direct sequence modulation, a carrier signal is modulated by a digital code sequence whose bit rate is much higher than the information signal bandwidth.

Information (i.e., the message signal consisting of voice and/or data) can be embedded in the direct sequence spread-spectrum signal by several methods. One method is to add the information to the spreading code before it is used for spreading modulation. It will be noted that the information being sent must be in a digital form prior to adding it to the spreading code, because the combination of the spreading code and the information typically a binary code involves modulo-2 addition. Alternatively, the information or message signal may be used to modulate a carrier before spreading it.

These direct sequence spread-spectrum communication systems can readily be designed as multiple access communication systems. For example, a spread-spectrum system may be designed as a direct sequence code division multiple access (DS-CDMA) system. In a DS-CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is low (i.e., approximately zero).

Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are de-emphasized.

It will be appreciated by those skilled in the art that several different spreading codes exist which can be used to separate data signals from one another in a DS-CDMA communication system. These spreading codes include but are not limited to pseudonoise (PN) codes and Walsh codes. A Walsh code corresponds to a single row or column of the Hadamard matrix.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio (usually expressed as bit energy per noise density i.e., $E_b/N_o$ which is defined as the ratio of energy per information-bit to noise-spectral density), to recover the signal at the cost of expending more bandwidth than would otherwise be necessary to transmit the data signal. For example, Walsh codes can be used to channel code a data signal prior to modulation of the data signal for subsequent transmission. Similarly PN spreading codes can be used to channel code a data signal.

However, channel coding alone may not provide the required signal to noise ratio for some communication system designs which require the system to be able to handle a particular number of simultaneous communications (all having a minimum signal to noise ratio). This design constraint may be satisfied, in some instances, by designing the communication system to coherently detect transmitted signals rather than using non-coherent reception techniques. In coherent detection systems, the channel response is determined so that the affects of phase and magnitude distortions caused by the communication channel can be compensated for with matched filters. In contrast, non-coherent detection systems typically do not compensate for the phase distortion in a received signal which was caused by the communication channel. It will be appreciated by those skilled in the art that a coherent receiver requires less signal to noise ratio (in $E_b/N_o$) than that required by a non-coherent receiver having the same bit error rate (i.e., a particular design constraint denoting an acceptable interference level). Roughly speaking, there is a three deciBel (dB) difference between them for the Raleigh fading channel. The advantage of the coherent receiver is more significant when diversity reception is used, because there is no combining loss for an optimal coherent receiver while there is always a combining loss for noncoherent receiver.

One such method for facilitating coherent detection of transmitted signals is to use a pilot signal. For example, in a cellular communication system the forward channel, or down-link, (i.e., from base station to mobile unit) may be coherently detected if the base station transmits a pilot signal. Subsequently, all the mobile units use the pilot channel signal to estimate the channel phase and magnitude parameters. However, for the reverse channel, or up-link, (i.e., from mobile to base station), using such a common pilot signal is not feasible. As a result, those of ordinary skill in the art often assume that only non-coherent detection techniques are suitable for up-link communication. As a result, many recent publications have focused on optimizing noncoherent reception in DS-CDMA systems. Ideally a communication system should be designed to coherently received DS-CDMA signals.

However, channel coding and coherent detection still may not provide the required signal to noise ratio for some communication system designs which require the system to be able to handle a particular number of simultaneous communications (all having a minimum signal to noise ratio). It will be appreciated by those skilled in the art that in spread-spectrum CDMA communication systems the noise interference level in the communication channel is directly related to number of simultaneous but code divided users within the communication channel. Thus, in order to reduce the noise interference, the number of simultaneous code divided users in the communication channel is typically limited.

In addition, the noise interference is also affected by the received signal power level. In some spread-spectrum communication systems (e.g., cellular systems) a central communication site typically attempts detect or receive more than one signal from a particular band of the electromagnetic frequency spectrum. The central communication site adjusts the receiver components to optimally receive signals at a particular received signal power threshold value. Those received signals having a received signal power level at or near the particular power threshold level are optimally received. While those received signals not having a received signal power level at or near the particular power threshold level are not optimally received. A non-optimally received signal tends to have a higher bit error rate and tends to cause unnecessary interference to other receivers. Either of these undesirable consequences of a non-optimally received signal can result in the communication system further limiting the number of simultaneous users in the communication channel associated with the central communication site.

Thus, it is desirable to maintain the received signal power level at or near the particular power threshold level. This can be accomplished by adjusting the signal power level of transmitters attempting to transmit to the central communication site. Therefore, by using power control schemes to maintain the received signal power levels at a particular power threshold level the number of simultaneous users in a communication channel can be maximized for a particular maximum error rate limit. This is especially important when vehicle speed is low. To achieve effective power control, an unbiased and accurate power estimate is needed. For non-coherent detection techniques in a DS-CDMA communication system, the use of orthogonal symbols, either bit interleaved or orthogonal symbol interleaved, is power estimation methods have been proposed, However, a need exists for a more accurate received signal power level estimation scheme for use in a coherent DS-CDMA spread-spectrum communication system. Through the use of a more accurate received signal power level estimation scheme, the number of simultaneous users in a communication channel can be increased over the number of simultaneous users in a communication channel using less accurate received signal power level estimation scheme while maintaining the same maximum error rate limit.

SUMMARY OF THE INVENTION

A method and apparatus is provided for estimating signal power. This is accomplished by demodulating a received communication signal to derive a stream of samples. These samples may consist of either reference samples, data samples, or a combination thereof. An estimate of the power of the received communication signal is then generated as a function of the stream of samples. The signal power estimate may, for example, be used in a power control algorithm by setting a power control indicator in response to a comparison between the signal power estimate and a predetermined threshold. Subsequently, the power control indicator is transmitted over a communication channel to another communication unit. The communication unit detects a power control indicator within a signal received from over the communication channel and adjusts a particular signal transmission power of a signal transmitter in response to the detected power control indicator.

DETAILED DESCRIPTION

Figure 1:
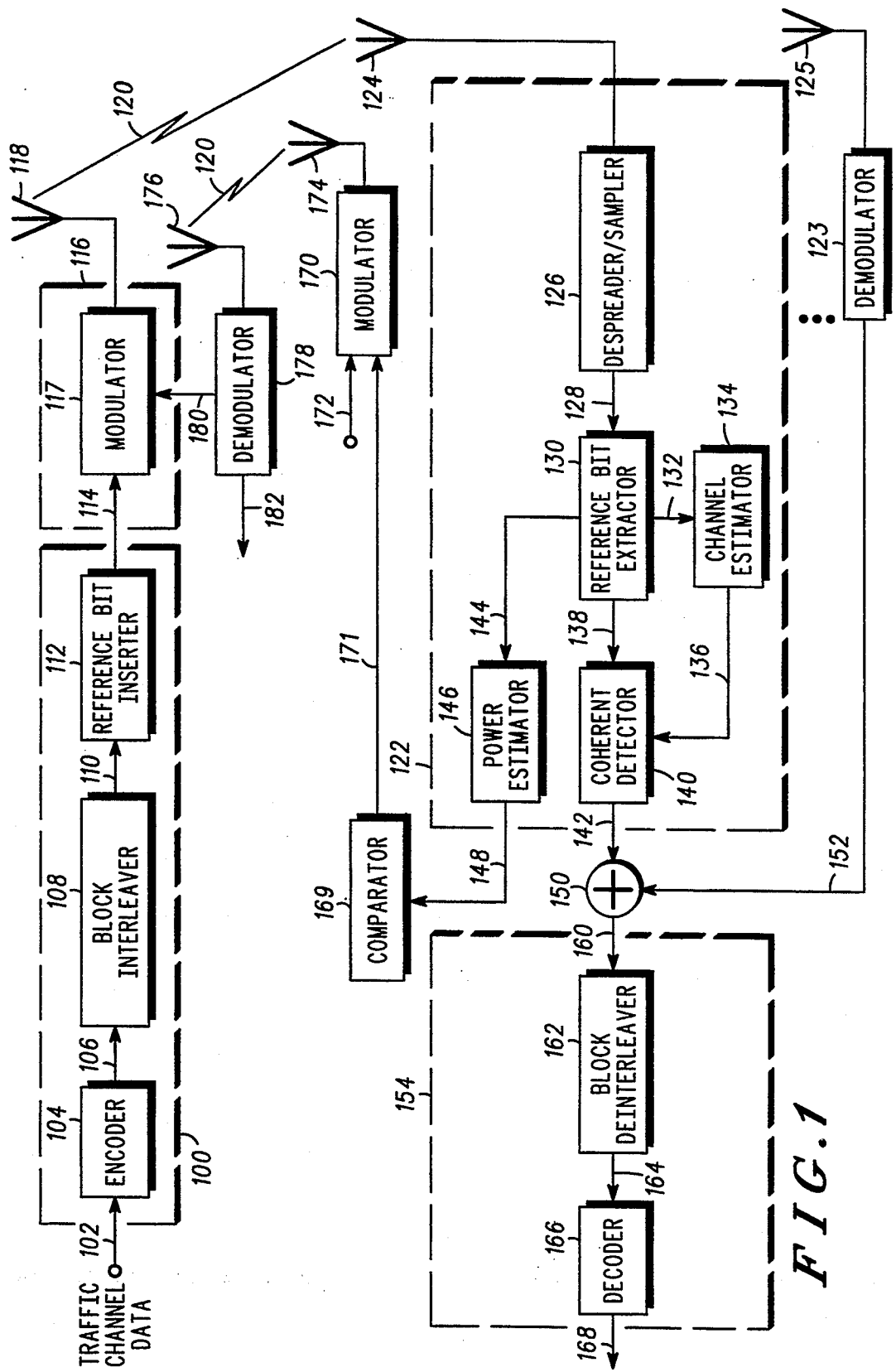
FIG. 1 is a block diagram showing a preferred embodiment communication system in accordance with the present invention.

In the course of the following discussion, a new approach for power control in up-link DS-CDMA communication systems is presented. This new approach is based on the coherent-detection with reference-symbol based channel estimation scheme which was described in a related patent application by Fuyun Ling entitled "Method and Apparatus for Coherent Communication in a Spread-Spectrum Communication System" filed Mar. 11, 1993 having U.S. Ser. No. 08/031,258 and assigned to Motorola, Inc. In this coherent communication scheme, reference bits are uniformly inserted into convolutionally encoded bits and used for channel estimation. At the receiver side, the known reference bits are used to generate reference symbols which have values of ±1. An accurate channel estimate is obtained by using these reference symbols and reference samples, which are the received signal samples corresponding to the reference bits, with a slight increased delay (e.g., approximately 4 milliseconds).

While such a short delay may not be a problem for the overall uplink communication, it cannot be tolerated for power estimation in a power control system. To reduce overall power control delay, only a few reference samples should be used to obtain a power estimate, which is an unbiased, but noise filled, estimate. Unfortunately, using a noise filled power estimate may reduce the effectiveness of power control. This problem could be solved by using all of the received samples for power estimate through the maximum likelihood (ML) channel estimation method such as the one described in a related patent application by David Falconer entitled "Path Gain Estimation in a Receiver" filed Aug. 13, 1993 having U.S. Ser. No. 08/106,250 and assigned to Motorola, Inc. A power estimate based on the ML method is indeed better than power estimate only based on the reference symbols. Nevertheless, the ML power estimate method is still not as effective as a power estimate based on orthogonal symbols used in the non-coherent DS-CDMA communication system design.

This inefficiency can be shown through simulations which indicate that the gain of coherent detection over non-coherent detection is greater at higher speeds than that at lower speeds. One such noncoherent DS-CDMA system is described in the communication standard known as IS-95 or "Mobile Station-Base Station Compatibility Standard for Dual-Mode Wideband Spread Spectrum Cellular System" and published by the Electronic Industries Association (EIA), 2001 Eye Street, N.W., Washington, D.C. 20006. When using the ML power estimation scheme, the gain of a coherent detection scheme for a vehicle speed of 100 kilometers per hour (kph) is about 2.5 decibels (dB) over this non-coherent detection scheme (i.e., in IS-95). However, this gain is reduced to 1.7 dB for that of 15 kph. Thus, further improvement of power estimate is important, especially for low vehicle speeds. In the following description a power control method is revealed which uses both known reference symbols and received signal samples corresponding to the encoded bits that are not a priori known in estimating signal power. In order to put the power control method into an example environment, a basic coherent DS-CDMA communication system will be described. Subsequently, how the different aspects of power control can be applied to that basic communication system will be discussed.

It will be appreciated by those skilled in the art that, although the following discussion describes a cellular based communication system, other types of communication systems (e.g., personal communication systems, trunked systems, satellite communication systems, data networks, and the like) may also be adapted and/or designed to use the principles described herein.

Referring now to FIG. 1, a system for coherent communication in a spread-spectrum communication system is shown. In the encoding portion 100 of the communication system, traffic channel data bits 102 are input to an encoder 104 at a particular bit rate (e.g., 9.6 kilobit/second). The input traffic channel data bits can include either voice converted to data by a vocoder, pure data, or a combination of the two types of data. Encoder 104 encodes the input data bits 102 into data symbols at a fixed encoding rate (1/r) with an encoding algorithm which facilitates subsequent maximum likelihood decoding of the data symbols into data bits (e.g., convolutional or block coding algorithms). For example, encoder 104 encodes input data bits 102 (e.g., 192 input data bits that were received at a rate of 9.6 kilobits/second) at a fixed encoding rate of one data bit to three data symbols (i.e., $\frac{1}{3}$) such that the encoder 104 outputs data symbols 106 (e.g., 576 data symbols output at a 28.8 kilo symbols/second rate).

The data symbols 106 are then input into an interleaver 108. Interleaver 108 organizes the data symbols 106 into blocks (i.e., frames) and block interleaves the input data symbols 106 at the symbol level. In the interleaver 108, the data symbols are individually input into a matrix which defines a predetermined size block of data symbols. The data symbols are input into locations within the matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. The interleaved data symbols 110 are output by the interleaver 108 at the same data symbol rate that they were input (e.g., 28.8 kilo symbols/second). The predetermined size of the block of data symbols defined by the matrix is derived from the maximum number of data symbols which can be transmitted at a coded bit rate within a predetermined length transmission block. For example, if data symbols 106 are output from the encoder 104 at a 28.8 kilo symbols/second rate, and if the predetermined length of the transmission block is 20 milliseconds, then the predetermined size of the block of data symbols is 28.8 kilo symbols/second times 20 milliseconds (ms) which equals 576 data symbols which defines a 18 by 32 matrix.

Figure 2:
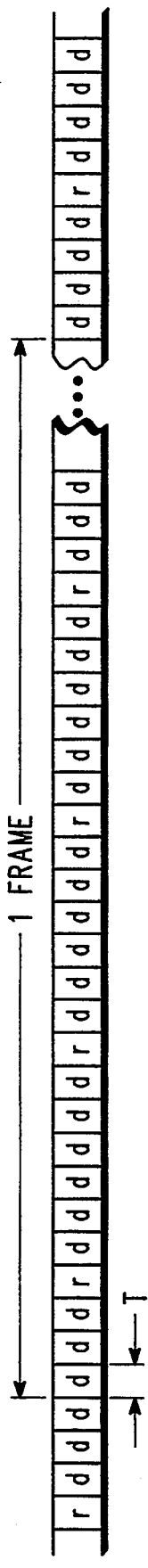
FIG. 2 is a block diagram showing a preferred embodiment communication channel frame structure for use in the preferred embodiment communication system shown in FIG. 1.

The interleaved data symbols 110 are then input to a reference bit inserter 112 which inserts L known reference bits for every M interleaved data symbols 110. To simplify the following discussion, it will be assumed that L=1 and M=6. In addition, it will be assumed that each inserted reference bit is a zero bit. However, it will be appreciated by those skilled in the art that L and M could be any other value without departing from the scope and spirit of the present invention. In addition, the reference bits could be any known sequence such as all one bits or several one bits followed by several zero bits without departing from the scope and spirit of the present invention. When L=2 and M=6, reference bit inserter 112 outputs 672 reference-coded symbols 114 for each block (i.e., frame) such that a reference bit is inserted between each group of six data symbols. An example of a transmitted block (i.e., frame) of reference-coded data symbols 114 consisting of 42 bits is shown in FIG. 2 (where each d represents a data symbol and each r represents a reference bit).

The reference-coded data symbols 114 is output from encoding portion 100 of the communication system and input to a transmitting portion 116 of the communication system. The data symbols 114 are prepared for transmission over a communication channel by a modulator 117. Subsequently, the modulated signal is provided to an antenna 118 for transmission over the communication channel 120.

The modulator 117 preferably prepares the data symbols 114 for direct sequence code divided spread-spectrum transmission by deriving a sequence of fixed length codes from the reference-coded data symbols 114 in a spreading process. For example, each of the data symbols within the stream of reference-coded data symbols 114 may be spread to a unique nine bit length code such that a group of six data symbols is represented by a single 54 bit length code. In addition, each reference bit within the stream of reference-coded data symbols 114 may select a ten bit length code. The codes representing the group of six data symbols and an associated reference bit preferably are combined to form a single 64 bit length code. As a result of this spreading process, the modulator 117 which received the reference-coded data symbols 114 at a fixed rate (e.g., 28.8 kilo symbols/second) now has a spread sequence of 64 bit length codes having a higher fixed symbol rate (e.g., 307.2 kilo symbols/second). It will be appreciated by those skilled in the art that the reference symbols and data symbols within the stream of reference-coded data bits 114 may be spread according to numerous other algorithms into a sequence of larger length codes without departing from the scope and spirit of the present invention.

The spread sequence is further prepared for direct sequence code divided spread-spectrum transmission by further spreading the spread sequence with a long spreading code (e.g., PN code). The spreading code is a user specific sequence of symbols or unique user code which is output at a fixed chip rate (e.g., 1.228 Megachips/second), In addition to providing an identification as to which user sent the encoded traffic channel data bits 102 over the communication channel 120, the unique user code enhances the security of the communication in the communication channel by scrambling the encoded traffic channel data bits 102. In addition, the user code spread encoded data bits (i.e., data symbols) are used to bi-phase modulate a sinusold by driving the phase controls of the sinusold. The sinusold output signal is bandpass filtered, translated to an RF frequency, amplified, filtered and radiated by an antenna 118 to complete transmission of the traffic channel data bits 102 in a communication channel 120 with BPSK modulation.

A receiving portion 122 of the communication system receives the transmitted spread-spectrum signal from over the communication channel 120 through antenna 124. The received signal is sampled into data samples by despreader and sampler 126. Subsequently, the data samples 142 are output to the decoding portion 154 of the communication system.

The despreader and sampler 128 preferably BPSK samples the received spread-spectrum signal by filtering, demodulating, translating from the RF frequencies, and sampling at a predetermined rate (e.g., 1.2288 Megasamples/second). Subsequently, the BPSK sampled signal is despread by correlating the received sampled signals with the long spreading code. The resulting despread sampled signal 128 is sampled at a predetermined rate and output to a reference bit (sample) extractor 130 (e.g., 307.2 kilo samples/second so that a sequence of four samples of the received spread-spectrum signal is despread and/or represented by a single data sample).

The reference bit extractor 130 preferably extracts the reference samples 132 from the despread sampled signal 128 and outputs the reference samples 132 to a channel estimator 134. The remaining data samples 138 from the despread sampled signal 128 are output to a coherent detector 140 for later coherent detection of data samples 142.

The channel estimator 134 correlates the extracted reference samples 132 with a known reference sequence of reference symbols to obtain unbiased, but noisy, channel estimates. In order to obtained a better channel estimate 136, these noisy estimates may be passed through a low-pass filter, which may be fixed or adaptive, to remove the high frequency noise components. The resulting channel estimates 136 are relatively noise-free and can be used for coherent detection. It should be noted that the low pass filtering only gives us a channel estimate for every $(M+1)T$, where M is the number of data symbols between each reference bit inserted by reference bit inserter 112 (e.g., $M=6$) and where T is the time interval of each data sample. To perform coherent detection of transmitted data symbols, we need to have a channel estimate for every T. When $(M+1)T$ is short relative to the channel variation time constant, a simple but effective method to get a channel estimate for every T is to perform linear interpolation between two channel estimates separated by $(M+1)T$. However, as will be appreciated by those skilled in the art more sophisticated interpolation techniques may be used if necessary.

After channel estimates 136 are generated, the rest of the receiver is conventional. The coherent detector 140 multiplies the remaining data samples 138 from the despread sampled signal 128 by the conjugate of the channel estimates 136 to generate coherently detected samples 142.

As will be appreciated by those skilled in the art, multiple receiving portions 122 through 123 and antennae 124 through 125, respectively, can be used to achieve space diversity. The Nth receiver portion would operate in substantially the same manner to retrieve data samples from the received spread-spectrum signal in communication channel 120 as the above described receiving portion 122. The outputs 142 through 152 of the N receiving portions preferably are input to a summer 150 which diversity combines the input data samples into a composite stream of coherently detected data samples 160.

The individual data samples 160 which form soft decision data are then input into a decoding portion 154 including a deinterleaver 162 which deinterleaves the input soft decision data 160 at the individual data level. In the deinterleaver 162, the soft decision data 160 are individually input into a matrix which defines a predetermined size block of soft decision data. The soft decision data are input into locations within the matrix so that the matrix is filled in a row by row manner. The deinterleaved soft decision data 164 are individually output from locations within the matdx so that the matrix is emptied in a column by column manner. The deinterleaved soft decision data 164 are output by the deinterleaver 162 at the same rate that they were input (e.g., 28.8 kilometrics/second).

The predetermined size of the block of soft decision data defined by the matrix is dedved from the maximum rate of sampling data samples from the spread-spectrum signal received within the predetermined length transmission block.

The deinterleaved soft decision data 164, are input to a decoder 166 which uses maximum likelihood decoding techniques to generate estimated traffic channel data bits 168. The maximum likelihood decoding techniques may be augmented by using an algorithm which is substantially similar to a Viterbi decoding algorithm. The decoder 166 uses a group of the individual soft decision data 164 to form a set of soft decision transition metrics for use at each particular time state of the maximum likelihood sequence estimation decoder 166. The number of soft decision data 164 in the group used to form each set of soft decision transition metrics corresponds to the number of data symbols 106 at the output of the convolutional encoder 104 generated from each input data bit 102. The number of soft decision transition metrics in each set is equal to two raised to the power of the number of soft decision data 164 in each group. For example, when a ⅓ convolutional encoder is used in the transmitter, three data symbols 106 are generated from each input data bit 102. Thus, decoder 166 uses groups of three individual soft decision data 164 to form eight soft decision transition metrics for use at each time state in the maximum likelihood sequence estimation decoder 166. The estimated data bits 168 are generated at a rate related to the rate that the soft decision data 164 are input to the decoder 166 and the fixed rate used to originally encode the input data bits 102 (e.g., if the soft decision data are input at 28.8 kilometrics/second and the original encoding rate was ⅓ then estimated data bits 168 are output at a rate of 9600 bits/second).

Thus, a communication system for coherently encoding and decoding has been described above with reference to FIG. 1. In summary, the communication system includes a first portion which encodes input data bits into data symbols, interleaves the data symbols in a symbol by symbol manner, inserts reference bits into the interleaved symbols, modulates and transmits the reference-coded data symbols over a communication channel. The communication system further includes a second portion which receives and demodulates a signal from over the communication channel, estimates parameters of the communication channel, coherently demodulates data samples within received signal, deinterleaves the coherently detected data samples which are used as soft decision data within each received transmission block, subsequently generates soft decision transition metrics from the deinterleaved individual soft decision data, and subsequently generates estimated data bits from the soft decision metrics by using maximum likelihood decoding techniques.

Turning now to the power control scheme for use in the preferred embodiment coherent communication system, the preferred embodiment power control algorithm preferably includes estimating received power every 1.25 ms (i.e., each block or frame) like the DS-CDMA communication system described in IS-95, or every 12 information bits, i.e., every 36 encoded data symbols or 42 total received signal samples. The power control algorithm includes despreading 126 a communication signal received 124 from over a communication channel 120 with a spreading code to derive a stream of samples, at one communication unit. This stream of samples may consist of reference samples, data samples, or a combination of both. The stream of samples 144 is input to a power estimator 146 so that an estimate 148 of the power of the received communication signal as a function of the stream of samples can be generated. It will be appreciated by those skilled in the art that in a diversity combining receiver, it is desirable to generate a combined power estimate from all of the diversity paths. Subsequently, a comparator or threshold device 169 sets a power control indicator 171 in response to the result of a comparison between the signal power estimate 148 and a predetermined threshold. This power control indicator 171 is prepared for transmission and transmitted through antenna 174 over the communication channel 120 by a modulator 170. It will be appreciated that other control information 172 (e.g., user authentication and channel hand-off information) may also be prepared and transmitted by modulator 170. In a DS-CDMA communication system, the power control indicator 171 may be prepared for transmission over the communication channel 120 by spreading the power control indicator 171 with a spreading code prior to transmission over the communication channel 120.

This power control indicator is then received by another communication unit. The power control indicator is received within a signal from over the communication channel 120 by antenna 176. Like the transmission process, for a DS-CDMA communication system, the power control indicator 171 may need to be despread 178 from the received signal with a spreading code prior to complete detection of the power control indicator 171. Once the power control indicator 180 is detected, the communication unit may adjust in the modulator 117 a particular signal transmission power of the signal transmitter 116 in response to the detected power control indicator 180. In addition, the other detected control information 182 (e.g., user authentication and channel hand-off information) can be used by the receiving communication unit.

The main part of this power control scheme is the acquisition of a power estimate 148. In this coherent communication system, the despreader 126 outputs N received samples $r_s(k)$, corresponding to the encoded symbols (i.e., signal samples) and M samples $r_{ref}(k)$, corresponding to the reference bits (i.e., reference samples) for each power estimation period. By way of example for the following discussion, N=36 and M=7. However, it will be appreciated by those skilled in the art that N and M may be varied to suit the needs of a particular communication system without departing from the scope and spirit of the present invention. Several power estimation algorithms could be used in this power control scheme.

In a DS-CDMA uplink communication system, the received signal samples r(n) 144 after despreading 126 can be expressed in the form:

$$r(n) = a(n)c(n) + z(n) \qquad \text{(Eq. 1)}$$

where a(n) represents either the convolutionally coded symbols mapped into values of ±1 or the reference symbols, c(n) is channel coefficient which is a complex number, and z(n) is interference term which mainly consists of the signal from other users in the communication system. It shall be assumed that the power estimation period is 1.25 ms, like in IS-95, which is relatively short in terms of communication channel variations. Therefore, the communication channel can be considered unvarying or constant during each power estimation period and expressed simply as c.

It will be appreciated by those skilled in the art that the received signal power (s) during an estimation period is simply:

$$s = S[|a(n)c|^2] = |c|^2 \qquad \text{(Eq. 2)}$$

because $|a(n)|^2 = 1$.

When, in a first power estimation scheme, a(n) is known (i.e., for reference symbols $a_r(n)$), the received signal power from (Eq. 1) can be expressed as:

$$s_{ref} = \frac{1}{7} \sum_{k=0}^{6} [|a_r(n)|^2 c + a_r^*(n)z(n)] = c + \frac{1}{7} \sum_{k=0}^{6} a_r^*(n)z(n), \qquad \text{(Eq. 3)}$$

where as previously noted $|a_r(n)|^2 = 1$. Thus, it will be appreciated that the sum on the right hand side of the (Eq. 3) is a Gaussian zero mean variable with a variance which is 1/7 of the variance of z(n). Which means that $S_{ref}$ is an unbiased estimate of c. By writing c as $|c|e^{j\phi c}$, the absolute value of $S_{ref}$ from (Eq. 3) can be written as:

$$|s_{ref}| = \left| c + \frac{1}{7} \sum_{k=0}^{6} a_r^*(n)z(n) \right| = \qquad \text{(Eq. 4)}$$

$$|c| \left| 1 + \frac{1}{|c|} e^{-j\phi c} \frac{1}{7} \sum_{k=0}^{6} a_r^*(n)z(n) \right|$$

If the signal noise variance is not large relative to $|c|$, then $$1 + \frac{1}{|c|} e^{-j\phi c} \frac{1}{7} \sum_{k=0}^{6} a_r^*(n)z(n)$$

is unlikely become negative. In such a case, $|S_{ref}|$ is a good estimate of $|c|$.

In the power control approach for IS-95, it is only necessary to determine if the received signal power (i.e., $|c|^2$) is larger or smaller than a predetermined threshold. This is equivalent to determining if $|c|$ is larger or smaller than the square-root of the original threshold. Thus, for a coherent DS-CDMA communication system which uses a similar power control approach, $|s_{ref}|$ can be directly used for power control.

In a second alternative power estimation scheme, a(n) consists of mapped convolutionally coded symbols $a_s(n)$. For this scheme, the received signal power from (Eq. 1) can be expressed as:

$$s_s = \frac{1}{36} \sum_{k=0}^{35} r_s^2(k) = \frac{1}{36} \sum_{n=0}^{35} (a(n)c + z(n))^2 \qquad \text{(Eq. 5)}$$

$$= \frac{1}{36} \sum_{n=0}^{35} (a_s^2(n)c^2 + 2a_s^2(n)cz(n) + z^2(n))$$

$$= c^2 + \frac{1}{36} \sum_{n=0}^{35} (2a_s^2(n)cz(n) + z^2(n)) \equiv c^2 + v$$

where v is approximately a zero-mean Gaussian random variable. Thus, $s_s$ is an unbiased estimate of $c^2$. Furthermore, the variance of v is small due to averaging.

By writing $c^2$ as:

$$c^2 = |c|^2 e^{j\phi c} \qquad \text{(Eq. 6)}$$

From (Eq. 5) and (Eq. 6) we can show that $|S_s|$ can be expressed as:

$$|s_s| = ||c|^2 + ve^{-j2\phi c}| = |c|^2 \left| 1 + \frac{1}{|c|^2} ve^{-j2\phi c} \right| \qquad \text{(Eq. 7)}$$

Using the same argument as above, if the variance of v is not too large relative to $|c|^2$, $|s_s|$ is a good estimate of $|c|^2$. Thus we can use $|s_s|$ as the power estimate for power control.

In a third alternative power estimation scheme, a(n) consists of mapped convolutionally coded symbols $a_s(n)$ and reference symbols $a_r(n)$. Further, it can be shown that $s^2_{ref}$ is an unbiased estimate of $c^2$. Thus, $s^2_{ref}$ and $s_s$ may be combined to obtain a better estimate of $c^2$. Similarly, the square-root of $s_s$ is an estimate of $|c|$, so that the square-root of $s_s$ and $s_{ref}$ can be combined to obtain a better estimate of $|c|$. These better estimates of $|c|$ and $c^2$ can be used as power estimates in a power control mechanism.

Figure 3:
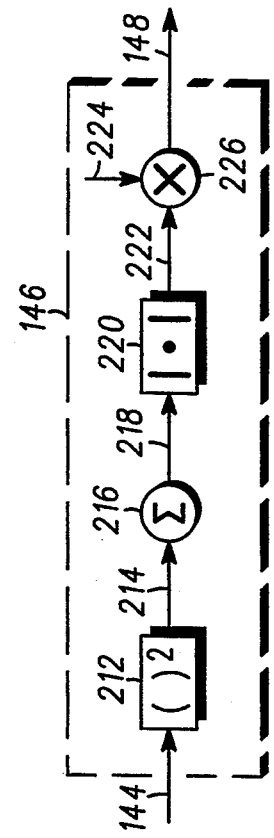
FIGS. 3 through 6 are block diagrams showing preferred embodiment signal power estimators for use in the preferred embodiment communication system shown in FIG. 1.

Referring now to the first power estimation algorithm, shown in FIG. 3, only reference samples 144 are used for power estimation 146. In using only the reference samples 144 for generating 146 a power estimate 148, only a scaled sum of a product needs to be calculated. For example, in (Eq. 8) which is derived from (Eq. 4), a preferred embodiment reference sample based is shown.

$$s_{ref} = \frac{1}{7} \sum_{k=0}^{6} a_r^*(k) r_{ref}(k) \qquad \text{(Eq. 8)}$$

where $a_r(k)$, k=0 to 6, are the reference symbols. As has been discussed above, the magnitude, or absolute value, of $S_{ref}$ (i.e., $|s_{ref}|$) can be used for power control as an approximation of a power estimate, although it is actually not a power estimate. This is implemented as summing device 200 which sums the stream of seven reference symbols (i.e., samples) together and inputs the sum 202 into a combiner 206. Combiner 208 multiplies the summed reference samples with a scale factor 204 (e.g., a 1/7 scale factor). This summing and multiplying operation results in a complex signal power estimate 208 (i.e., an estimate which has a real and imaginary part). This complex signal power estimate 208 is transformed into a reference-based signal power estimate 148 by calculating 210 the magnitude of the average complex reference signal power estimate 208. It will be appreciated by those skilled in the art that the long term accuracy of this complex signal power estimate can be improved by averaging several estimates together to form an average complex reference signal power estimate.

Figure 4:
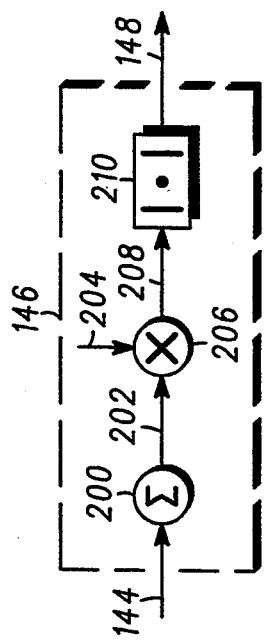

Referring now to the second alternative power estimation algorithm shown in FIG. 4, only convolutionally coded samples 144 are used for power estimation 148. A square of the received signal samples are determined and a scaled sum of these squared values is formed, as derived from (Eq. 5) as follows:

$$s_s = \frac{1}{36} \sum_{k=0}^{35} r_s^2(k) \qquad \text{(Eq. 9)}$$

Note that $r_s(k)$ are complex numbers and $s_s$ is also a complex value. As has been previously shown, the magnitude of $s_s$, i.e., $|s_s|$, is an estimate of the signal power and can be used for power control. This is implemented with a complex squaring device 212 which squares convolutionally coded data samples 144. These thirty-six complex squared data samples 214 are the summed together by a summer 216. Subsequently, the summed complex data samples 218 are transformed into a data-based signal power estimate 222 by calculating 220 it's magnitude. This data-based signal power estimate 222 is then properly scaled by a combiner 226 which multiplies it with a scale factor 224 (e.g., a 1/36 scale factor). This properly scaled data-based signal power estimate 148 is then output by power estimator 146 for use in a power control algorithm. It will be appreciated by those skilled in the art that, like the first power estimate, the long term accuracy of this signal power estimate can be improved by averaging several complex squared data samples together to form an average complex squared data sample prior to generating the data-based signal power estimate 148 from a magnitude operation 220.

Figure 5:
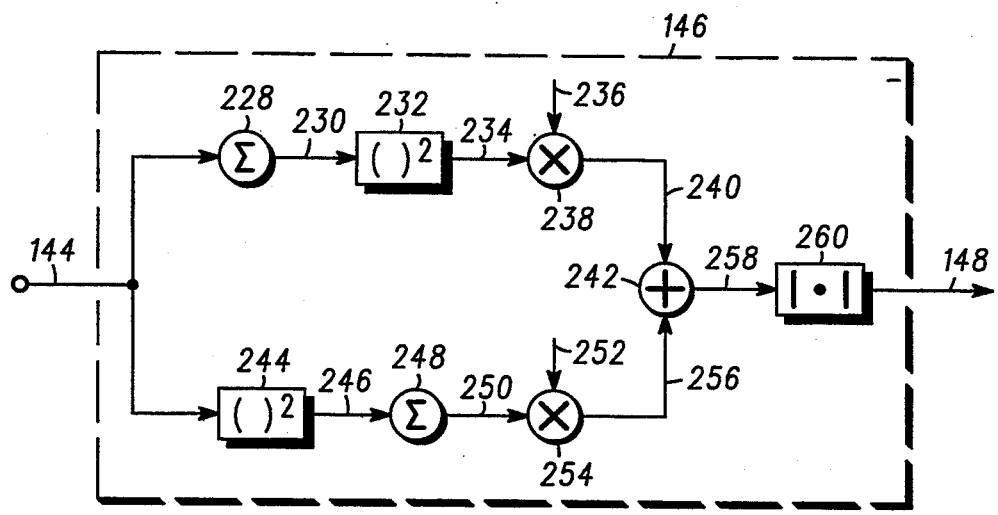
Figure 6:
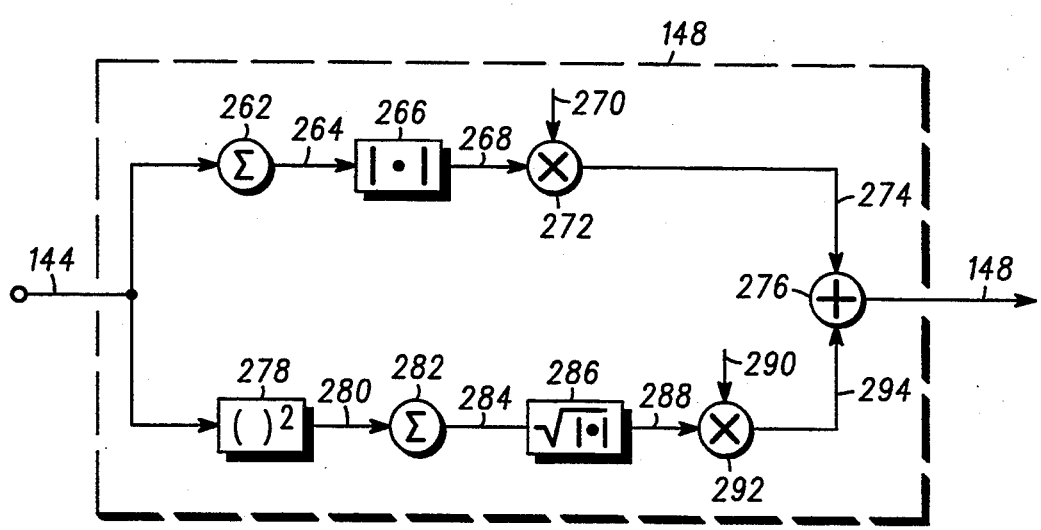

Referring now to the third alternative power estimation algorithm, shown in FIGS. 5 and 6, both reference samples and convolutionally coded data samples 144 are used for power estimation 146. More accuracy may be achieved by using both the reference and signal samples for power estimation 146. There are a few different ways to combine these samples. The first method is to simply using a variation of (Eq. 9) by treating $r_{ref}(k)$ no different from $r_s(k)$ and forming the power estimate $p_1$ given by:

$$p_1 = \left| \frac{1}{43} \sum_{k=0}^{42} r^2(k) \right| \qquad \text{(Eq. 10)}$$

where $r(k)$ represents both $r_{ref}(k)$ and $r_s(k)$. Because more samples are used, the estimate given by (Eq. 10) is better than that given by (Eq. 9).

The second method (shown in FIG. 5) is to form a sum 258 of $s_s$ and the square value of $S_{ref}$ (which are performed by elements 228-240 for $s_{ref}$ and elements 244-256 for $s_s$). The magnitude 260 of the sum 258 is used as the power estimate 148. To obtain a better unbiased estimate, both values 240 and 256 should be weighted as a linear combination before forming 242 the sum 258. More precisely, the power estimate $P_2$ is formed by:

$$p_2 = \left| \frac{2}{3} s_s + \frac{1}{3} s^2_{ref} \right|. \qquad \text{(Eq. 11)}$$

The third method (shown in FIG. 6) is to form a weighted sum 148 of the absolute value of the real part of $s_{ref}$ and the square root of the magnitude of $s_s$ (which are performed by elements 262-274 for $s_{ref}$ and elements 278-294 for $s_s$. Similar to (Eq. 11) in order to obtain a better unbiased estimate, values 274 and 294 should be weighted as a linear combination before forming 276 the sum 148. More precisely, the power estimate $P_3$ is formed by:

$$p_3 = \frac{2}{3} |s_{ref}| + \frac{1}{3} \sqrt{|s_s|} \qquad \text{(Eq. 12)}$$

It will be appreciated by those skilled in the art that the weighting factors may be modified for a particular communication system without departing from the scope or spirit of the present invention.

The second and third methods would give similar results. However, the second method is preferable because it is computationally simpler. It is also much simpler than the previously mentioned ML power estimation method. It is expected that the performance of the coherent DS-CDMA receiver can be improved at 15 kph vehicle speeds by about 0.7 dB over the ML power estimating scheme. Further improvements are also possible for very low vehicle speeds. As a result, the coherent DS-CDMA receiver using one of the above-mentioned signal power estimates for power control should consistently outperform the IS-95 based DS-CDMA receiver by about 2.2 dB without diversity combining and about 2.6 dB with two port diversity combining.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system as described were directed to CDMA spread-spectrum signals transmitted over a radio communication channel. However, as will be understood by those skilled in the art, the encoding and decoding techniques described and claimed herein can also be adapted for use in other types of transmission systems like those based on time division multiple access (TDMA) and frequency division multiple access (FDMA). In addition, the communication channel could alternatively be an electronic data bus, wireline, optical fiber link, satellite link, or any other type of communication channel.

What is claimed is:

1. An apparatus comprising a signal power estimator, the signal power estimator comprising:
   (a) demodulating means for demodulating a received communication signal to derive a stream of samples selected from the group consisting of: a stream of reference samples and a stream of data samples; and
   (b) estimating means, operatively coupled to the demodulating means, for generating a complex signal power estimate of the power of the received communication signal as a function of the stream of samples.

2. The apparatus of claim 1 wherein the estimating means comprises means for generating a plurality of complex signal power estimates from the stream of reference samples by correlating a known reference sequence with the stream of reference samples.

3. The apparatus of claim 2 wherein the estimating means further comprises averaging means for averaging the plurality of complex signal power estimates together to form an average complex reference signal power estimate.

4. The apparatus of claim 3 wherein the estimating means further comprises means for generating a reference-based signal power estimate by calculating the magnitude of the average complex reference signal power estimate.

5. The apparatus of claim 1 wherein the estimating means comprises means for generating a plurality of complex squared data samples from the stream of data samples by complex squaring the stream of data samples.

6. The apparatus of claim 5 wherein the estimating means further comprises averaging means for averaging the plurality of complex squared data samples together to form an average complex squared data sample.

7. The apparatus of claim 6 wherein the estimating means further comprises means for generating a data-based signal power estimate by calculating the magnitude of the average complex squared data sample.

8. The apparatus of claim 1 wherein the estimating means comprises:
 (a) average complex reference signal power estimate means for generating a plurality of complex signal power estimates from the stream of reference samples by correlating a known reference sequence with the stream of reference samples and averaging the plurality of complex signal power estimates together to form an average complex signal power estimate;
 (b) average complex squared data sample means for generating a plurality of complex squared data samples from the stream of data samples by complex squaring the stream of data samples and averaging the plurality of complex squared data samples together to form an average complex squared data samples; and
 (c) signal power estimate means, operatively coupled to the average complex reference signal power estimate means and the average complex squared data sample means, for calculating a magnitude of a linear combination of the average complex reference signal power estimate squared and the average complex squared data sample.

9. The apparatus of claim 1, further comprising means for determining a magnitude of the complex signal power estimate to produce a sample-based signal power estimate.

10. The apparatus of claim 9 further comprising a threshold means, operatively coupled to the signal power estimator, for setting a power control indicator in response to the result of a comparison between the sample-based signal power estimate and a predetermined threshold.

11. The apparatus of claim 10 further comprising a signal transmitting means, operatively coupled to the threshold means, for transmitting the power control indicator over a communication channel.

12. The apparatus of claim 11 wherein the signal transmitting means comprises means for preparing the power control indicator for transmission over the communication channel by spreading the power control indicator with a spreading code prior to transmission over the communication channel.

13. The apparatus of claim 11 wherein the communication channel is selected from the group consisting essentially of an electronic data bus, radio communication link, satellite communication link, wireline and optical fiber link.

14. The apparatus of claim 11 further comprising:

(a) signal receiving means for detecting a power control indicator within a signal received from over the communication channel; and
(b) power adjustment means, operatively coupled to the signal receiving means, for adjusting a particular signal transmission power of a signal transmitter in response to the detected power control indicator.

15. The apparatus of claim 14 wherein the signal receiving means comprises means for despreading the received signal with a spreading code to detect the power control indicator.

16. A communication unit, comprising:
 (a) a signal power estimator including demodulating means for demodulating a received communication signal to derive a stream of samples selected from the group consisting of: a stream of reference samples and a stream of data samples, estimating means, operatively coupled to the demodulating means, for generating a complex signal power estimate of the power of the received communication signal as a function of the stream of samples, and means for determining a magnitude of the complex signal power estimate to produce a sample-based signal power estimate;
 (b) threshold means, operatively coupled to the signal power estimator, for setting a power control indicator in response to the result of a comparison between the sample-based signal power estimate and a predetermined threshold; and
 (c) signal transmitting means, operatively coupled to the threshold means, for transmitting the power control indicator over a communication channel.

17. The apparatus of claim 16 wherein the signal transmitting means comprises means for preparing the power control indicator for transmission over the communication channel by spreading the power control indicator with a spreading code prior to transmission over the communication channel.

18. A communication unit, comprising:
 (a) signal receiving means for detecting a power control indicator within a signal received from over it communication channel, the power control indicator being derived from a comparison between a sample-based signal power estimate and a predetermined threshold, the sample-based signal power estimate being derived from it magnitude of a complex signal power estimate of a power of a despread communication signal as a function of a stream of samples selected from the group consisting of: a stream of reference samples and a stream of data samples;
 (b) power adjustment means, operatively coupled to the signal receiving means, for adjusting a particular signal transmission power of a signal transmitter in response to the detected power control indicator.

19. The apparatus of claim 18 wherein the signal receiving means comprises means for despreading the received signal with a spreading code to detect the power control indicator.

20. A method of estimating signal power, comprising:
 (a) demodulating a received communication signal to derive a stream of samples selected from the group consisting of: a stream of reference samples and a stream of data samples; and (b) generating a complex signal power estimate of the power of the received communication signal as a function of the stream of samples.

21. The method of claim 20, further comprising the step of determining a magnitude of the complex signal power estimate to produce a sample-based signal power estimate.

22. The method of claim 20 wherein the generating step comprises generating a plurality of complex signal power estimates from the stream of reference samples by correlating a known reference sequence with the stream of reference samples.

23. The method of claim 22 further comprising a step of averaging the plurality of complex signal power estimates together to form an average complex reference signal power estimate.

24. The method of claim 23 further comprising a step of generating a reference-based signal power estimate by calculating the magnitude of the average complex reference signal power estimate.

25. The method of claim 20 wherein the generating step comprises generating a plurality of complex squared data samples from the stream of data samples by complex squaring the stream of data samples.

26. The method of claim 25 further comprising a step of averaging the plurality of complex squared data samples together to form an average complex squared data sample.

27. The method of claim 26 further comprising a step of generating a data-based signal power estimate by calculating the magnitude of the average complex squared data sample.

28. The method of claim 20 wherein the generating step comprises the steps of:
(a) generating a plurality of complex signal power estimates from the stream of reference samples by correlating a known reference sequence with the stream of reference samples and averaging the plurality of complex signal power estimates together to form an average complex signal power estimate;
(b) generating a plurality of complex squared data samples from the stream of data samples by complex squaring the stream of data samples and averaging the plurality of complex squared data samples together to form an average complex squared data samples; and
(c) calculating a magnitude of a linear combination of the average complex reference signal power estimate squared and the average complex squared data sample.

29. The method of claim 21 further comprising the step of setting a power control indicator in response to the result of a comparison between the sample-based signal power estimate and a predetermined threshold.

30. The method of claim 29 further comprising a step of transmitting the power control indicator over a communication channel.

31. The method of claim 30 wherein the step of transmitting comprises preparing the power control indicator for transmission over the communication channel by spreading the power control indicator with a spreading code prior to transmission over the communication channel.

32. The method of claim 30 wherein the communication channel is selected from the group consisting essentially of an electronic data bus, radio communication link, wireline and optical fiber link.

33. The method of claim 30 further comprising the steps of:
(a) detecting a power control indicator within a signal received from over the communication channel; and
(b) adjusting a particular signal transmission power of a signal transmitter in response to the detected power control indicator.

34. The method of claim 33 wherein the step of detecting comprises despreading the received signal with a spreading code to detect the power control indicator.

* * * * *

UNITED STATES PATENT AND TRADEMARK OFFICE
CERTIFICATE OF CORRECTION

PATENT NO. : 5,412,686
DATED : May 2, 1995
INVENTOR(S) : Ling

It is certified that error appears in the above-indentified patent and that said Letters Patent is hereby corrected as shown below:

Column 16, Line 43 "over it" should be --over a--.

Column 16, Line 48 "from it" should be --from a--.

Signed and Sealed this

Second Day of January, 1996

Attest:

BRUCE LEHMAN

*Attesting Officer*   *Commissioner of Patents and Trademarks*